Figure 1:
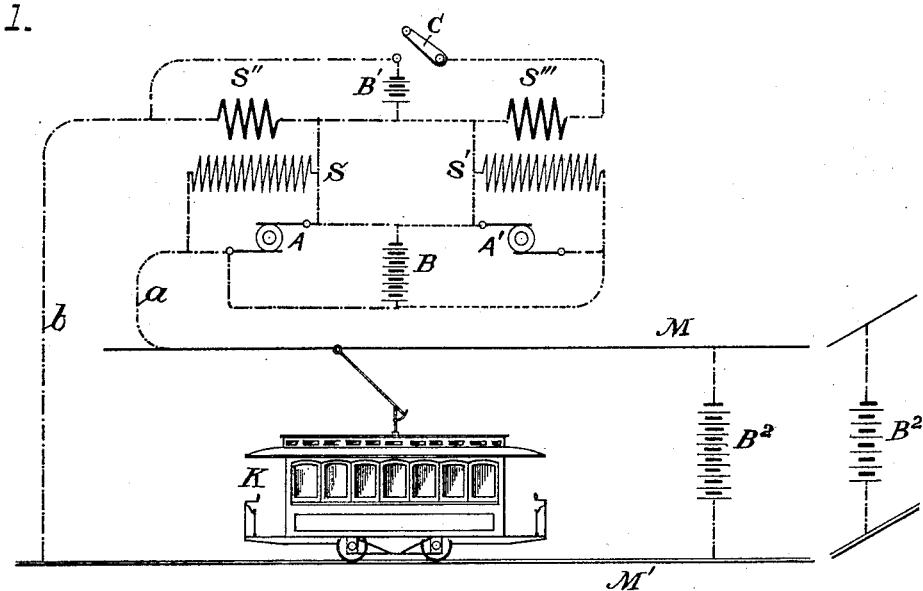

(No Model.)

E. THOMSON.
ELECTRIC POWER SYSTEM.

No. 434,489. Patented Aug. 19, 1890.

WITNESSES:

INVENTOR
Elihu Thomson
BY
H. L. Townsend
ATTORNEY.

UNITED STATES PATENT OFFICE.

ELIHU THOMSON, OF LYNN, MASSACHUSETTS.

ELECTRIC-POWER SYSTEM.

SPECIFICATION forming part of Letters Patent No. 434,489, dated August 19, 1890.

Application filed October 9, 1889. Serial No. 326,492. (No model.)

*To all whom it may concern:*

Be it known that I, ELIHU THOMSON, a citizen of the United States, and a resident of Lynn, in the county of Essex and State of Massachusetts, have invented a certain new and useful Electric Power or Lighting System, of which the following is a specification.

My invention relates to those systems of electric distribution in which the translating devices are fed in multiple arc from mains supplied with electric energy of approximately constant potential and wherein the demands for energy upon the electric mains or circuits are subject to sudden fluctuations from sudden changes in the load when the translating devices are connected to or disconnected from such mains.

The object of my invention is to maintain as far as may be a constancy in the potential and steadiness of current or electric capacity of the line in spite of such fluctuations, and, further, to avoid the production of induced currents upon telephone or telegraph lines from variations of current in the lines of an electric lighting or power system parallel to them.

My invention involves the use of some means for controlling the electric condition of the main line in such manner that great changes in the strength of electric current or vibrations flowing over the same cannot take place in short intervals of time; and it consists, essentially, in the application to the electric mains or lines from which energy is taken of some electric-storage device connected thereto at intervals or at points on such line where changes in the current flow are liable to take place or to produce disturbing effects inductively.

My invention consists, further, in preventing induction from an electric power or lighting line upon a neighboring line by charging a storage-battery or other accumulator of energy from such line and discharging the stored energy into the line simultaneously with and at or near the points where a sudden increase of demand and drop of potential or vibration of potential or current is liable to take place.

My invention consists, also, in certain combinations of storage-battery and dynamo-machine designed to steady the action of the machine and more particularly hereinafter described and claimed. This storage device, which may be a secondary battery or condenser, but is preferably the former, may be made of low capacity for coulombs, while its counter electro-motive force is equal to the average pressure or potential on the electric main or circuit. The storage device is connected directly to the main at or near the points where the sudden changes in the demand for energy upon such circuit or line are liable to take place, and in the case of an electric railway may be distributed along the line at any convenient points, so that there shall be whenever a car is started a storage device not far away from the car. It is also advisable to place such storage devices at or near the grades on the line. In the case of electric mains supplying other translating devices—as, for instance, electric-lighting mains—the storage devices may be distributed along such mains or may be placed at points where sudden and great changes of load are liable to take place, as where electric switches are located, for cutting off or throwing in a large number of translating devices at once.

While my invention is particularly applicable to electric railways in which the demand for current rapidly changes, according as no power at all may be required or the full capacity of the motors on the car be exerted, it is nevertheless applicable to any other electric line where widely varying or vibrating amounts of current are required by the translating devices which would tend to produce any great variation of electro-motive force or potential. My invention is especially useful, however, in the elimination of trouble upon telephone-lines adjacent to or running parallel with electric light or power circuits upon which large fluctuations or vibrations in current strength may be occasioned because of greatly-varying demands of the lights or motors for current. With a secondary battery connected as described to an electric line, should the supply-current from any cause drop in potential or pressure below the average, the secondary battery will immediately furnish for a limited period, depending upon its capacity, a potential sufficient to compensate for this drop, and, again, should the electro-motive force of the supply current rise above the normal for a short period, the secondary battery or condenser will act to absorb a great gush or impulse of current and prevent its doing damage.

Figure 2:
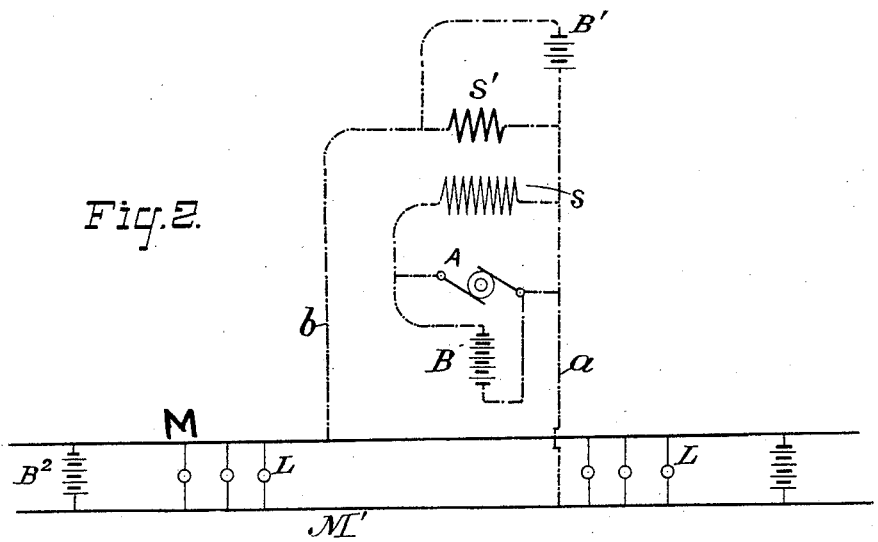

In the accompanying drawings, Figure 1 is a diagram of circuits and apparatus illustrating my invention. Fig. 2 illustrates the application of the invention to electric-lighting mains.

Referring to Fig. 1, A indicates the armature of a dynamo-machine, S the shunt-field winding, and S'' the series-field winding of the machine when compound wound.

M M' are electric-railway power lines or mains connected to the dynamo by wires $a\,b$. These mains M M' are here indicated as an overhead wire M and a return-main M', consisting of the rails upon which the railway-car K moves, such car being provided with the usual electric motor for propelling it and any means for drawing electric energy from the main M.

B indicates a secondary battery composed of a sufficient number of plates in series to yield a potential when charged equally to the rated potential of the generator A. The battery B is connected in multiple or in a branch around the armature of the machine and the shunt-winding S. The series-winding S'' is provided with another secondary battery B', connected in like manner in multiple with said winding or as a branch around it.

Another generator may be employed to feed the line in multiple with that described, as indicated. The generator of such a nature is indicated at A' and the shunt and series field windings at S' and S''', respectively. By the connections shown an equalizing-connection, which serves to equalize the load on the two dynamos, is provided of a similar character to that forming the subject of patent to E. W. Rice, Jr., No. 328,223, dated October 13, 1885. It will also be seen that the batteries, being joined to such equalizing-connections, serve as compensators, in the manner hereinafter described, for both generators.

$B^2$ is a secondary battery connected to the mains M M' in multiple with the work—such as electric-railway motors—and at a distant point upon the line. There may be a number of such batteries placed upon the line and distributed along the same at distances apart, depending upon the extent of the line and the number of cars running thereon and the location of the stated stopping-points for the cars, if there be any such. Where there are grades upon the line, a battery or batteries should be located at such point, since at such grades the demand of the motor upon the energy of the main is always greater.

At the time of starting a car K a very heavy current is demanded, especially if it be started while upon a steep grade. This demand of the motor upon the line for energy will ordinarily occasion a large drop of potential at the point on the circuit where the car happens to be at the time, the extent of the drop or change depending upon the capacity of the generator or generators and the ampère capacity of the mains between the generators and the point of connection of the car-motor. While this drop of potential may be only momentary and productive of no injury to the electrical apparatus on the car, and may not give rise to any difficulty in the operation, it is nevertheless an undesirable condition from all points of view and will give rise to a sudden change in the current traversing the main. This current will act inductively upon any neighboring electric circuit—such as a telephone-circuit—and under exaggerated conditions is a serious disturbance to successfully speaking over a telephone-line. If, however, a secondary battery $B^2$ is connected, as shown, to the line at a point somewhere near the point where the change of potential takes place, when this great demand for current for the motors arises the battery will be capable of delivering current in considerable volume for a short time and will act as a re-enforcer of the potential on the line, so as to prevent a great change of potential between the generator and the car, thus preventing a great change in the flow of current over the line-circuit.

Fluctuations in the demand upon the circuit may take place not only in the starting, but also while the car is running, and will cause rapid variations in the amount of current, (according to the conditions of the track,) which currents, flowing along the line for a considerable distance, would create disturbing inductive effects upon parallel circuits. When, however, the drop of potential is prevented by the supply of energy from the storage-battery near at hand, the current will not flow in fluctuating amount over any great length of main circuit, and as no great length of telephone-circuit is subjected to inductive effects, no trouble will be experienced. It is particularly the variation of current which occurs when the car is running, and which is known as the "shake," which is the cause of the trouble on telephone-circuits and which my invention will almost entirely, if not quite, overcome.

The batteries B B' operate at the generator to steady the current traversing the shunt and series windings of the field-magnets and therefore to steady the potential of the electric energy delivered from such machines. The number of plates employed in the batteries will be in such instances such that when they are charged they will yield a potential equal to that of the coils to which they are shunts, respectively.

In Fig. 2 I have illustrated the application of my invention to electric mains M M' supplying incandescent lamps L L in multiple between such mains. Two groups of lamps are shown, and in connection with each is illustrated a secondary battery B², connected to the mains at or near the point of location of the groups of lamps. Where such lamps are thrown on in groups, so as to make a sudden change in the potential at the point of connection, the secondary batteries will operate to re-enforce the failing potential and by maintaining it prevent a sudden fluctuation in the current flowing over the mains from the generator in the manner already described.

I am aware that it has heretofore been proposed to connect storage-batteries to electric mains near the source of energy, and I am also aware that in a series multiple arc system of distribution it has been proposed to connect storage-batteries to the mains at or near the location of the several groups. In my invention, however, the storage-batteries are connected to mains supplying devices in multiple arc at or near the point where the translating devices draw their energy from the mains, as hereinbefore described.

What I claim as my invention is—

1. The combination, in a system of electric distribution, of mains of approximately constant potential supplied from a suitable generator, translating devices connected to and supplied from such mains in multiple arc, and compensating electric-storage devices constantly connected across said mains at or near the point of consumption or connection of the translating devices where variations of load or potential are immediately felt with variations in the demand of the translating devices.

2. In an electric-railway system, the combination, with the power line or circuit, of electric accumulators connected thereto at or near stopping-points or heavy grades.

3. The combination, with the power or main line for an electric railway, of storage devices connected to such line at or near grades in the same.

4. The combination, with an electric-railway power-line supplied with current of approximately constant potential and electric-railway motors fed in multiple from such line, of electric-storage devices constantly connected also in multiple to said line at points along the circuit where the demands upon the line made by the electric railway motors vary suddenly.

5. The combination, with an electric generator having a main-circuit field-magnet coil and a derived-circuit field-magnet coil, of storage-batteries in branches around said coils, respectively, as and for the purpose described.

6. The combination, with a dynamo-generator having a derived-circuit field-magnet coil, of a storage-battery in a branch around the armature and derived-circuit coil and a main-circuit field-magnet coil provided with a storage-battery in a branch around it.

7. The combination, with a compound-wound dynamo-machine, of a storage-battery in a charging-circuit independent of the field-magnet coil and forming a branch around the armature and derived-circuit field-magnet coil.

8. The herein-described method of preventing induction of an electric-railway power-line upon neighboring power-lines, consisting in alternately charging and discharging an accumulator connected to the power-circuit at or near the point of disturbance in accordance with variations in the demand of the motor and changes in potential of the power-line due thereto.

9. The herein-described method of avoiding induction from an electric lighting or power line to a neighboring telephone or telegraph line, consisting in storing energy from the lighting power-line and discharging the stored energy into the line at or near the points of said line where a sudden increase of demand on the line tends to lower the potential thereof.

10. The herein-described method of preventing induction from an electric-railway power-line upon a neighboring telephone-line, consisting in supplying a re-enforcing potential to the railway power-line simultaneously with an increase of demand by the railway-motor and at or near the point where such demand is liable to be made.

11. The combination, with dynamo-machines having an equalizing-connection between the main-circuit coils, of a secondary battery connected to such equalizing-connection and in multiple with both coils.

12. The combination, with dynamo-machines having their armatures connected in parallel to the main circuit and provided with an equalizing-connection for the armatures, of a secondary battery joined to the equalizing-connection and in a branch around both armatures.

Signed at Lynn, in the county of Essex and State of Massachusetts, this 4th day of October, A. D. 1889.

ELIHU THOMSON.

Witnesses:
JOHN W. GIBBONEY,
HERMANN LEMP.